A. M. GOW.
DUMP CAR.
APPLICATION FILED JULY 16, 1917.
1,248,312.
Patented Nov. 27, 1917.
2 SHEETS—SHEET 1.
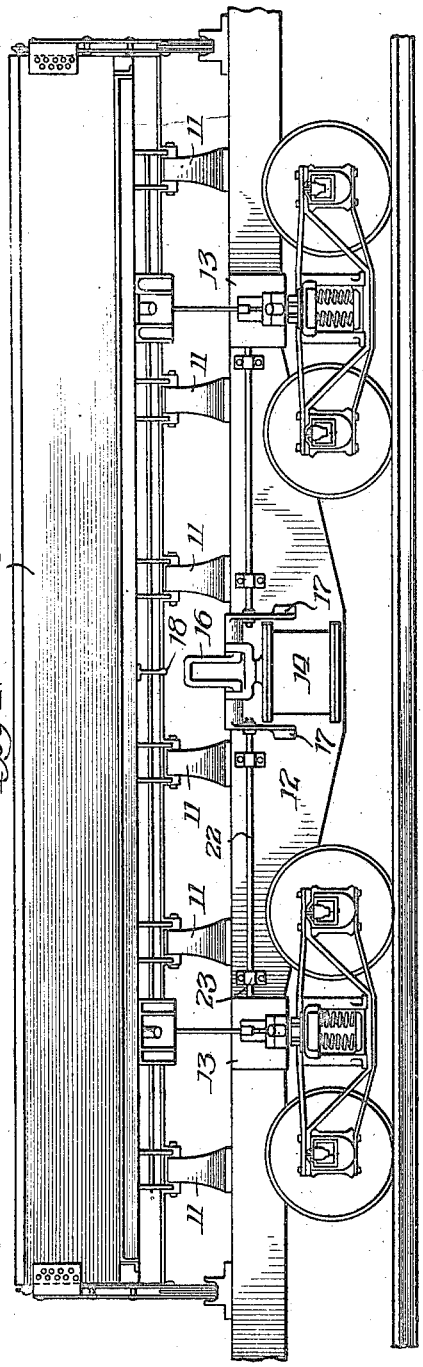
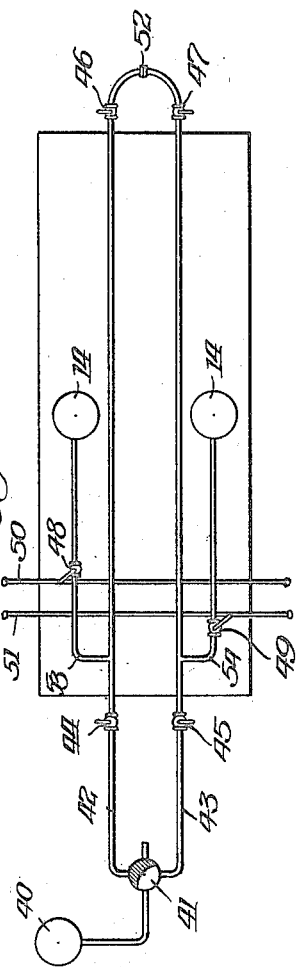
Witnesses:
Inventor
Alex. M. Gow
By D. Anthony Usina
Atty

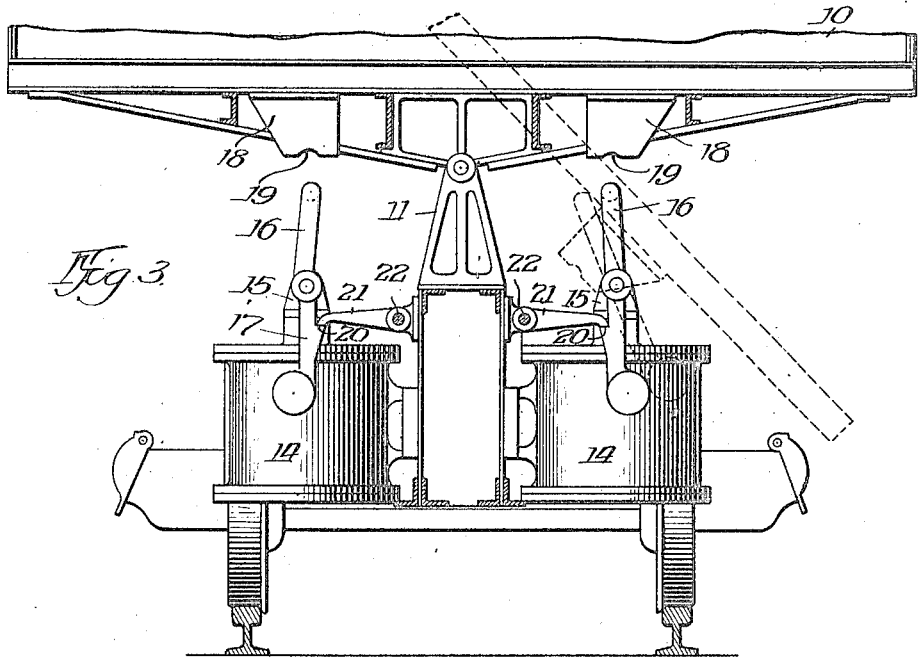
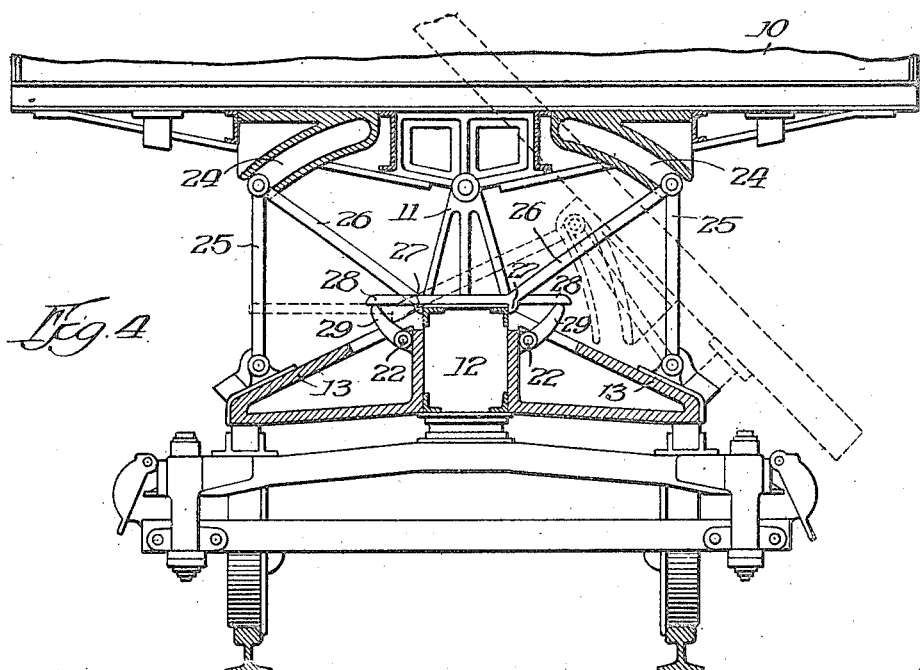

UNITED STATES PATENT OFFICE.

ALEXANDER M. GOW, OF DULUTH, MINNESOTA.

DUMP-CAR.

1,248,312. Specification of Letters Patent. Patented Nov. 27, 1917.

Original application filed July 26, 1916, Serial No. 111,332. Divided and this application filed July 16, 1917. Serial No. 180,769.

*To all whom it may concern:*

Be it known that I, ALEXANDER M. GOW, a citizen of the United States, and resident of Duluth, in the county of St. Louis and State of Minnesota, have invented certain new and useful Improvements in Dump-Cars, of which the following is a specification.

My invention relates to railway cars and has particular reference to a novel side dump car.

This application is a division of my copending application Serial No. 111,332, filed July 26, 1916.

My invention comprises a dump car of that type wherein a body adapted to dump on either side is supported by hinge castings upon a car frame which carries upright dumping cylinders actuated by compressed air. The car is equipped with locking mechanism to secure the body in a horizontal position. This locking mechanism is disengaged by the first few inches of the motion of the operating piston, which then engages the bottom of the car body and dumps it. The body is righted to the horizontal position by the operating piston on the other side. The locking mechanism prevents the car body, upon being righted, from passing the horizontal position and dumping on the other side.

Owing to the high center of oscillation and high center of gravity of the load, the tendency of the car body to rock from side to side is very great. In most cars of this type this rocking motion is checked by chains secured between the car body and the body bolster of the frame. In certain makes of cars, tension members forming part of the locking mechanism are used to check this rocking motion. In my design compression members are used between the body of the car and the body bolster of the frame, and these members constitute part of the locking mechanism.

There is a very decided mechanical advantage in using compression as against tension members for this purpose. The strain incident to this rocking motion must be absorbed by the truck springs on the side toward which the body rocks. The outer end of the body bolster rests upon the truck springs. Compression members located between the ends of the body bolsters and the car body would transmit the strain directly; and such compression members would be displaced on the side toward which the car is dumped and replaced when the car is righted.

Two distinct functions are performed by the upward motion of the piston in the operating cylinder. The first four inches of upward motion serve to disengage the locking mechanism on the opposite side of the car. The remainder of the travel serves to tip the car body over, the compression members then being free to fold out of the path of travel of the body. When by the action of the piston in the opposite cylinders the car body is righted, the compression members are automatically restored to their upright positions.

In the operation of these cars a wide latitude must be provided for in the application of the air. Upon the locomotive handling the train is provided a supply of compressed air. The engineer should be able to dump and right the entire train to either side from the locomotive; or any one car must be capable of being dumped and righted singly; or one or more cars may be dumped to one side and the remainder to the other side. It is also very desirable that each car may be dumped and righted from one side. In most cases it is dangerous for a man to be on the side toward which the car dumps. Furthermore, in order to avoid mistakes or confusion the operating levers, controlling the air supply on each side of the car, should be alike so that there be no danger of a man's dumping the car toward him.

Referring now to the drawings:

Figure 1 shows a side elevation of the car;

Fig. 2 shows diagrammatically the arrangement of air piping;

Fig. 3 is an end elevation showing the dumping cylinders;

Fig. 4 is a vertical section showing the locking mechanism in end elevation.

Referring to Fig. 1, the car body 10 is supported on hinge castings 11—11, secured to the frame 12. Body bolsters 13—13 are secured to the frame 12 and are carried by the trucks in the usual manner. Air cylinders 14, shown also in Fig. 3, are secured to the frame 12. These cylinders are equipped with pistons and piston rods, not shown. To the top of each piston rod is secured a yoke 15, carrying a swinging member composed of an upper part 16 and a lower part 17. To the car body 10 is secured the push block 18, having a depression 19 adapted to engage the upper end of part 16. On the inside surface of the part 17 is a lug 20 adapted to engage the arm 21, secured to the shaft 22. As shown in Fig. 1, shaft 22 is supported by bearings 23—23 and extends into the body bolster 13.

In Fig. 4 is shown the locking mechanism. To the car body is secured the hollow guide casting 24, adapted to receive the upper ends of the two compression members 25 and 26. Member 25 is pivoted to the body bolster 13, while member 26 butts at its lower end against car frame 12, by means of the lug 27. From lug 27 the arm 28 extends across the car frame and projects on the opposite side. To the end of the shaft 22 is secured the dog 29 in contact with and beneath the arm 28. The operation is as follows: When the left hand piston 14, in Fig. 3, receives air, the yoke 15 rises and the shaft 22 is rotated by means of the arm 21 and the lug 20. This disengages lug 27 from the frame 12 and unlocks the locking mechanism on the side opposite. As the piston rises further, the member 16 engages the notch 19 on the push block 18 and the car body 10 begins to dump. As it descends, the push block 18 strikes member 16 at an angle, and as it is free to swing it assumes the position shown by the dotted lines. At the same time the compression members 25 and 26 have, by means of guide casting 24, been guided to the position shown by dotted lines, and the car is dumped. In this position push block 18 rests upon the center of the yoke 15, over the upper end of the piston rod. Inasmuch as member 16, is shaped like an inverted U, the push-block enters the space between the two legs of the member. The air having been released from left-hand cylinder 14, it is turned into right-hand cylinder 14. Yoke 15, bearing on the push-block 18, rises and forces the low side of the car body upward. It is not necessary or desirable that the car body shall be pushed clear up to the horizontal position, for it is so balanced that only a few inches of travel of the piston are required to overcome the tendency of the body to remain in the dumped position, when it resumes a horizontal position without further assistance. As the car body is righted, guide casting 24, restores the members 25 and 26 to their former position; lug 27 drops over the edge of the frame 12, and the car body is locked in the horizontal position. It will be seen that when the car is in the dumped position, the lug 20 on member 17, is out of engagement with the arm 21, on the side upon which the car is dumped, because of the angular position, as shown by dotted lines, of the swinging member composed of the upper part 16, and the lower part 17. When, therefore, the piston starts to rise to right the car, the shaft 22 is not rotated, and the locking mechanism on the opposite side is not disengaged. If it were the momentum of the body would cause it to pass the horizontal position and dump on the other side. Air being released from the left-hand cylinder 14, the piston rod, yoke and members 16 and 17, descend by gravity and all parts assume the position shown in Figs. 3 and 4. When the piston rod carrying the yoke 15 and the members 16 and 17 descends by gravity, the air being released from the cylinder, the parts assume the position shown in Figs. 3 and 4 and the car is locked in the horizontal position.

Referring now to Fig. 2, wherein the piping is shown diagrammatically: On the locomotive is the reservoir 40, containing compressed air furnished by the air pump in the usual manner. The four way valve 41 is adapted to give air to either pipe line 42 or 43, furnishing air to the dumping cylinders. The usual cut-out cocks 44—45—46—47 are installed on these air lines. By means of the hose coupling 52, air lines 42 and 43 may be coupled together on the last car of the train. From line 42 is taken the branch 53 leading to the air cylinder on that side of the car, and from line 43 is taken the branch line 54 leading to the air cylinder on its side of the car. Branch line 53 is controlled by dump cock 48, operated by rod 50, and branch line 54 is controlled by the dump cock 49, operated by the rod 51. Rods 50 and 51 extend clear across the car and can be operated from either side. Suppose it is desired that the entire train shall be dumped and righted from the engine. Dump cocks 48 and 49 are set to the open position in a clockwise movement as shown in Fig. 2, by pushing the left hand rod and pulling the right hand rod on either side of the car. Cut-out cocks 44 and 45 are set to the open position on each car. Valve 41 on the engine is set to the closed position. To dump, the engineer throws air on either line 42 or 43 and the cars dump to the opposite side. He then throws air on the other line and the train rights. Suppose it is desired to operate the cars one at a time, independent of the engineer. Cut-out cocks 46 and 47 are opened and valve 41 on the engine is set in the position shown. Both air lines 42 and 43 are now under pressure. Dump cocks 48 and 49 are closed. Now push the left hand rod and any car dumps from the operator. Pull the right hand rod and the car rights toward the operator.

Suppose it is desired to "spot" and dump several cars at one place and then move the train and dump the remainder at the same place. To avoid the danger from leaking of cocks 48 and 49, it is preferable that in transit the air lines 42 and 43 be not under pressure. Consequently valve 41 is closed. Cut-out cocks 46 and 47 on the last car are closed. When the cars are "spotted," push the left hand rods on the cars to be dumped. Signal the engineer to throw air on the line on the side where the operator is. Should he make a mistake no harm is done, for the other dumping cocks are closed. The cars dump. Now pull the right hand rods and signal the engineer to throw air on the other line and the cars right. It will be understood that these cars are operated at night, in bad weather by men of very ordinary intelligence. In addition, it is a serious matter to dump a car the wrong way, and a "fool-proof" and safe arrangement of the operating rods is absolutely necessary for the successful operation of the trains. My arrangement gives the desired flexibility of operation, makes both sides of the car alike, and to any man can be explained that if he pushes the left hand rod the car will go from him and if he pulls the right hand rod the car will go toward him. It is obvious that this arrangement could be reversed without changing the principle involved.

I claim:

1. In a dump car, the combination of a pair of dumping cylinders, valves for controlling the passage of a fluid under pressure thereto for dumping and righting the car, and operating means for the said valves duplicated at each side of the car whereby the car may be dumped and righted from either side.

2. In a dump car, the combination of a pair of dumping cylinders, valves for controlling the passage of a fluid under pressure thereto for dumping and righting the car, and duplicate operating means for said valves on opposite sides of said car whereby the car may be dumped away from the operator on one side of the car and righted toward him.

3. In a dump car, the combination of a pair of dumping cylinders, valves for controlling the passage of a fluid under pressure thereto for dumping and righting the car, and operating means for said valves at one side of the car whereby the car may be dumped away from an operator on one side of the car and righted toward him.

4. In a dump car, a pair of dumping cylinders, an air line to each cylinder, a valve in each air line, and operating means for said valves on each side of the car whereby the car may be dumped and righted from either side of the car.

5. In a dump car, a pair of dumping cylinders, an air line to each cylinder, a valve in each air line, and an operating member for each of said valves operable from either side of the car for dumping and righting the car from either side thereof.

6. In a dump car, a pair of dumping cylinders, an air line to each cylinder, a valve in each air line, and operating members for said valves operable from either side of the car, one of said members to dump the car away from the operator and the other for righting the car toward the operator.

7. In a dump car of the bodily side-dumping variety, a pair of dumping cylinders, an air line to each cylinder, a valve in each air line, an operating means for each valve, both said operating means extending entirely across the car, the arrangement of parts being such that the actuation of the left hand operating means at either side of the car will cause the car to dump away from the operator and the actuation of the right hand operating means at either side of the car will cause the righting of the car, substantially as described.

Signed at Duluth, Minn., this 2nd day of July, 1917.

ALEXANDER M. GOW.

Witnesses:
JOHN E. CARLSON,
D. B. CLARK.

Copies of this patent may be obtained for five cents each, by addressing the "Commissioner of Patents, Washington, D. C."